UNITED STATES PATENT OFFICE 2,584,009

FERMENTATION PROCESS

Jackson W. Foster, Austin, Tex., and Lloyd Everett McDaniel, Rahway, N. J., assignors to Merck & Co., Inc., Rahway, N. J., a corporation of New Jersey No Drawing. Application September 27, 1947, Serial No. 776,612

4 Claims. (Cl. 195—36)

This invention relates to fermentation processes, and particularly to an improved procedure for the production of penicillin by propagation of strains of molds belonging to the genus Penicillium under aerobic submerged conditions.

In the production of penicillin in large tanks or fermenters in which the medium is constantly maintained in a state of agitation and aeration, it is found that penicillin content of the fermented medium gradually builds up to a maximum amount and then tends to fall off, apparently due to the accumulation in the medium of factors which modify or destroy the penicillin already produced. It has therefore been the usual practice to stop the fermentation as close as possible to the point of maximum penicillin content in the broth, to remove the entire fermented broth for recovery of penicillin therefrom, and to recharge the fermenter with fresh medium and inoculum.

This periodic emptying and recharging of the fermenter is objectionable not only because of the time loss in making the changes, but also because of the relatively long initial period in each fermentation during which only minute amounts of penicillin are produced.

We have discovered an improved procedure by which it is possible substantially to reduce the time loss in conventional procedures above mentioned and to increase the amount of penicillin produced per unit of fermenter capacity.

In accordance with our improved process, a fermentation is conducted in the conventional manner for an initial period of 2 to 3 days until a penicillin content of the broth approaches the expected maximum. A quantity of the broth, preferably about 20% of the total broth in the fermenter, is then removed from the fermenter and an equivalent amount of fresh nutrient medium is added. The withdrawal of broth and addition of new medium is thereafter repeated at intervals of about 5 to 6 hours, while fermentation conditions, i. e., incubation temperature, and agitation and aeration of the medium, are maintained substantially uniform. The successive portions of broth removed from the fermenter can be treated separately or collected and treated in larger batches for recovery of the penicillin therefrom. By this semi-continuous fermentation procedure, 10 to 15, or even more withdrawals of broth and additions of fresh medium can be made before the penicillin content of the remaining broth falls to such an extent as to indicate that further continuation of the fermentation is impracticable. When this point is reached the fermentation is stopped, and the entire residual broth is removed for recovery of penicillin therefrom.

Our improved process is not dependent upon the use of a culture medium of particular composition but is applicable for use with any medium containing assimilable carbon, assimilable nitrogen, and nutrient inorganic salts, which is otherwise satisfactory for production of penicillin under aerobic submerged conditions. In carrying out our process it is preferable to prepare in advance, a large volume of medium, which is then sterilized by heating at 120° C. for about 15 minutes, and drawing from this large volume to supply the initial medium and successive additional amounts of medium so that the composition of fresh medium used in a given fermentation remains constant. In addition to the nutrient components of the medium, a quantity of anti-foam agent is preferably included in the medium to prevent excessive foaming due to the agitation and aeration during fermentation. Suitable de-foamers include soy bean oil, castor bean oil, "Nopco 1519" (a low viscosity hydrocarbon mineral oil blended with processed vegetable oils, distributed by National Oil Products Company), and the like.

The following example shows how the improved procedure of the present invention can be carried out, but it is to be understood that this example is given by way of illustration and not of limitation.

Example

A medium was prepared having a unit composition approximately as follows:

Brown sugar, 20 gm. per liter
Sodium nitrate, 6 gm. per liter
Monobasic potassium phosphate, 1.5 gm. per liter
Magnesium sulfate, 0.5 gm. per liter
Zinc sulfate, 10 mg. per liter
Cornsteep liquor, 30 cc. per liter
Tap water, to 1000 cc.
Nopco 1519, 5000 cc. per 500 gals.

The medium was sterilized by heating at 120° C.

for 15 minutes, and 500 gallons of the sterilized medium was placed in a 750-gallon fermenter equipped with an agitator and means for blowing sterile air through the liquid. The medium was then inoculated with spores of *Penicillium notatus*, and was then incubated at about 25° C. with continuous agitation and aeration. The airflow was held at 5 cu. ft./min. for the first 30 hours, raised to 10 cu. ft./min. for the next 18 hours, and thereafter held at 15 cu. ft./min.

After 60 hours of incubation approximately 20% of the broth was withdrawn from the fermenter, and an equivalent amount of sterile medium was added, and the fermentation continued as before. This procedure was repeated at approximately 5-hour intervals, and each withdrawn portion of broth was assayed for penicillin content. Data with respect to 12 withdrawn portions is tabulated below:

| Withdrawal of Broth | Age Hours | Volume Liters | pH | Assay u./ml. | Total Units. $\times 10^6$ |
|---|---|---|---|---|---|
| 1st | 60 | 225 | 7.3 | 60 | 16 |
| 2nd | 65½ | 350 | 7.2 | 48 | 17 |
| 3rd | 73½ | 350 | 7.2 | 58 | 20 |
| 4th | 78 | 350 | 7.3 | 54 | 19 |
| 5th | 83 | 350 | 7.3 | 62 | 22 |
| 6th | 88 | 340 | 7.3 | 64 | 22 |
| 7th | 92 | 340 | 7.2 | 70 | 24 |
| 8th | 95 | 340 | 7.3 | 53 | 18 |
| 9th | 100 | 350 | 7.2 | 58 | 20 |
| 10th | 105 | 350 | 7.2 | 52 | 18 |
| 11th | 110½ | 350 | 7.5 | 36 | 13 |
| 12th | 114 | 350 | 7.3 | 39 | 14 |

The drop in penicillin content shown by the assay of the 11th and 12th withdrawn portions indicates that further continuation of the process was impractical.

It will be evident that our improved procedure permits fermentation over an extended period of time, of considerably larger amounts of culture medium than is possible with the usual single fermentation procedure. This is of real practical significance since it means that in equipment of a given size, it is possible to produce considerably larger amounts of penicillin than would be possible if the usual single fermentation procedure were followed. A further advantage of our process is an indirect advantage arising from the reduction in time that a fermenter must be out of operation between successive fermentation runs. Any reduction in the time that a fermenter must be out of operation leads to an increase in the over-all yield of the fermenter over an extended period.

While in the example given above, the first withdrawal of fermented broth was made after 60 hours of incubation, it is to be understood that the timing of the initial withdrawal as well as the timing of successive withdrawals of broth will vary to some extent with different culture media and with different strains of inocula. For best results, the initial withdrawal should be made just before maximum penicillin content in the broth is reached.

Various changes and modifications in the foregoing procedure can be made without departing from the spirit and scope of the present invention, and we are to be limited only by the appended claims.

We claim:

1. The process that comprises propagating a penicillin producing strain of a mold belonging to the genus Penicillium in a culture medium under aerated submerged conditions for about 2–3 days, withdrawing a portion of the fermented broth just prior to the time that penicillin content of the broth reaches a maximum, and adding an equivalent amount of fresh culture medium having substantially the same composition as the original medium, continuing the fermentation until the penicillin content of the broth again approaches a maximum, again withdrawing a portion of the broth and adding an equivalent amount of fresh culture medium, and continuing such withdrawals of broth and additions of fresh culture medium after successive 5 to 6-hour periods of fermentation until the combined amount of the withdrawn portions of broth is at least equal to the original volume of the culture medium, and thereafter until the withdrawn broth shows a distinct drop in penicillin content, and collecting the withdrawn portions of broth for recovery of penicillin therefrom.

2. The process that comprises propagating a penicillin producing strain of a mold belonging to the genus Penicillium in a culture medium under aerated submerged conditions for about 60 hours, then withdrawing 20% of the volume of the broth and adding an equivalent volume of fresh culture medium having substantially the same composition as the original medium, continuing the fermentation with intermittent withdrawals of broth and additions of fresh culture medium at 5 to 6-hour intervals until the combined amount of the withdrawn portions of broth is at least equal to the original volume of the culture medium, and thereafter until a sample of withdrawn broth shows a distinct drop in penicillin content, and collecting the several withdrawn portions of broth for the recovery of penicillin therefrom.

3. The process that comprises propagating a penicillin producing strain of a mold belonging to the genus Penicillium in a culture medium under aerated submerged conditions for about 2–3 days, withdrawing about 20% of the fermented broth just prior to the time that penicillin content of the broth reaches a maximum, and adding an equivalent amount of fresh culture medium having substantially the same composition as the original medium, continuing the fermentation until the penicillin content of the broth again approaches a maximum, again withdrawing about 20% of the broth and adding an equivalent amount of fresh culture medium, and continuing such withdrawals of broth and additions of fresh culture medium after successive 5 to 6-hour periods of fermentation until the combined amount of the withdrawn portions of broth is at least equal to the original volume of the culture medium, and thereafter until the withdrawn broth shows a distinct drop in penicillin content, and collecting the withdrawn portions of broth for recovery of penicillin therefrom.

4. In the production of penicillin by aerated submerged propagation of a penicillin producing strain of a mold belonging to the genus Penicillium in a culture medium for about 2–3 days, the process that comprises withdrawing a portion of the fermented medium when the penicillin content thereof approaches a maximum and adding an equivalent amount of fresh culture medium having substantially the same composition as the original medium, repeatedly thereafter withdrawing fermented medium and adding equivalent amounts of fresh medium at about 5- to 6-hour intervals until the combined amount of the withdrawn portions of broth is at least equal to the original volume of the culture medium, and thereafter until a withdrawn portion shows a decided drop in penicillin content, and then discontinuing the fermentation and collecting all of the fermented medium for the recovery of penicillin therefrom.

JACKSON W. FOSTER.
LLOYD EVERETT McDANIEL.

REFERENCES CITED

The following references are of record in the file of this patent:

UNITED STATES PATENTS

| Number | Name | Date |
|---|---|---|
| 2,422,777 | Eisenberg et al. | June 24, 1947 |
| 2,442,141 | Moyer | May 25, 1948 |

OTHER REFERENCES

Moyer et al., Journal of Bacteriology, v. 51, January 1946, pages 86, 87.

Abraham et al., The Lancet, Aug. 16, 1941, page 177.